United States Patent [19]

Broughton

[11] 4,396,508
[45] Aug. 2, 1983

[54] SEPARATOR FOR MULTI-PHASE LIQUIDS

[76] Inventor: Amos W. Broughton, P.O. Box 505, Temple City, Calif. 91780

[21] Appl. No.: 296,961

[22] Filed: Aug. 27, 1981

[51] Int. Cl.³ .............................................. B01D 21/10
[52] U.S. Cl. .................................... 210/187; 210/522; 210/537; 210/802
[58] Field of Search ......... 210/187, 521, 537, DIG. 5, 210/519, 534, 185, 186, 802, 522

[56] References Cited

U.S. PATENT DOCUMENTS

| | | | |
|---|---|---|---|
| 3,147,221 | 9/1964 | Johnston | 210/320 |
| 3,529,758 | 9/1970 | Middelbeek et al. | 210/522 |
| 3,886,064 | 5/1975 | Kosonen | 210/522 |
| 4,122,016 | 10/1978 | Tao et al. | 210/537 |
| 4,132,651 | 1/1979 | de Jong | 210/522 |
| 4,202,778 | 5/1980 | Middelbeek | 210/522 |
| 4,316,805 | 2/1982 | Faust et al. | 210/187 |

*Primary Examiner*—Charles N. Hart
*Assistant Examiner*—Sharon T. Cohen

[57] ABSTRACT

A separator of multi-phase combinations of oil (low density) liquid phase, water phase, and solid sludge (high density) has an inlet low velocity liquid spreader disposed across and near the inside base of a closed separator tank. At least one inclined separator baffle is disposed and sealed completely across the tank interior, inclined from a baffle base terminus adjacent the tank base to a top baffle terminus adjacent the top of the tank and having a narrow oil volume phase collector continuing from the top baffle terminus to the interior tank top. The oil phase outlet of the separator tank connects to the narrow oil volume phase and is disposed adjacent to the top of the collector tank. The oil outlet is substantially elevated above the corresponding water phase outlet disposed on and connecting to the separator tank on the opposed side of the separator baffle. A tank solid sludge outlet provides for removal of the collected sludge from the tank bottom. The separator baffle can be heated as needed.

8 Claims, 4 Drawing Figures

SEPARATOR FOR MULTI-PHASE LIQUIDS

BACKGROUND OF THE INVENTION

The multi-phase liquid separator of this invention is classified in Class 210, subclasses 522, 521, 242, 83, 73, 188 and the like.

Middelbeek disclosed in U.S. Pat. No. 4,202,778 issued May 13, 1980, a separating device providing a separator enclosed tank housing, multiple parallel separator sloping plates, a stilling space in the front of said separator, a top side first collecting space, a feeding space near the inlet side of the separator, a second collecting space near the top wall, and a third collecting space behind the separator plates.

Wagner, in U.S. Pat. No. 4,213,865 issued July 22, 1980, disclosed an apparatus for separating sludge, oil and water. The apparatus has walls and a first and second compartment. An enclosed plate pack is mounted on an inclined wall within the apparatus, with the pack sloping downwardly from a first to a second end. The oil contaminated water passes through the plate pack and the oil separates from the water and flows out a first end of the apparatus and water flows out of a second tank outlet, while sludge is removed from a bottom tank third outlet.

In U.S. Pat. No. 4,132,651, issued Jan. 2, 1979, de Jong disclosed a separating device for two liquids of different specific gravities employing a basin and a separator unit having flow ways spaced one above the other in inverted V-shape plates. The flow ways are disposed upwardly inclined in the direction of the length of the parallel plates. The lower gravity liquid is directed from the basin inlet adjacent to the lower extremity of the plates, the liquid separation occurring in the separator plates.

Teasdale, in U.S. Pat. No. 4,056,472, issued Nov. 1, 1977 discloses an oil recovery apparatus having a flotation platform with a simple weir oil skimmer disposed across the flotation platform. Oil passing over the leading weir edge is sucked through a slotted flow equalizing baffle plate and removed to a collection location or vessel.

Ayers, in U.S. Pat. No. 4,049,554 issued Sept. 20, 1977, disclosed a skimmer for removing oil from a surface of a body of water. A flexible skimming head has a foraminous sheet structure with an integral chevron flow pattern on its upper surface.

In U.S. Pat. No. 3,933,654 issued Jan. 20, 1976, Middelbeek disclosed a device for separating oil from an oil laden liquid in which a tank having an inlet and outlet in opposed walls has at least two parallel inclined plates between them to define a tortuous path for the liquid. The plate adjacent the inlet has one edge secured to the inlet wall to define a space to minimize the turbulence of the incoming liquid.

SUMMARY OF THE INVENTION

A separator for multi-phase liquids has a closed chamber tank with a regular plan cross section and an initial inlet pipe disposed adjacent the chamber tank base. The inlet comprises a low velocity spreader for the incoming liquids, branching from a single inlet pipe, through multiple secured pipe branches of equal diameters, providing inlet fluid velocity transition from turbulent to laminar flow inlet fluid. The exits of the final pipe multiple inlets have top slots disposed therein which allow the separating lower density oil phase to begin coalescing and escaping upward through the water phase, through the linear slots. The terminal inlet pipes may have 90° elbow angles secured thereto, the elbow exits disposed upward. The multiple terminal inlet pipes are located in and at the chamber tank elevation adjacent to the base terminus of the at least one inclined plane secured completely across the chamber.

The top terminus of the at least one inclined plane terminates adjacent the chamber wall securing the initial inlet pipe, being inclined at approximately 45° angle. The top terminus of one plane continues up the chamber tank interior as the separating and enclosing wall of the oil phase reservoir. The oil phase outlet pipe is located and secured through the chamber tank wall, collecting the less dense oil phase as it rises and floats through the more dense water phase. The water outlet pipe is located and secured through the chamber tank wall at about the top terminus of the inclined baffle providing a water phase outlet drain on the chamber wall opposed to the oil phase reservoir. A third sludge outlet drain and/or man hole provides for removal of dirt and sludge collected on the chamber floor below the base terminus of the inclined plane. The oil phase pipe outlet and the water phase pipe outlet are positioned through the tank wall, so as to provide the oil phase pipe outlet a higher elevation position on the tank wall then the water phase pipe outlet, collecting the risen oil phase.

A second inclined plane baffle can be disposed and secured 0.5 to 2.5 cm above the first inclined plane baffle, located in the water phase collector volume, parallel and fully extensible across the closed chamber tank. The second baffle has a plane base approximately and separately coterminous with the first baffle base terminus and having a plane top terminus below the water outlet in the enclosed chamber. The hot water phase of an oil-water multi-phase can be utilized to warm the first plane baffle and its contiguous collecting oil phase. A separate steam coil or an electric heater can be secured to the first plane baffle adjacent to the oil phase collecting thereunder, and a heat insulator layer can be alternatively secured to the opposed non-adjacent face of the first plane baffle.

The enclosed chamber tank may have a square, rectangular, round or other selected cross section, and an appropriate chamber tank height as required for a specific separation installation.

Included in the objects of this invention are:

To change a horizontal thin film of oil to a vertical narrow film of easily collectable oil To provide a separator for multi-phase liquids.

To provide an emergency separator for separating floating second lower density phases of toxic liquids from water.

To provide a simple, reliable separator for easily separating crude oils and other hydrocarbons from water, such as oil-well water.

To provide a low cost, portable separator divide for separating multi-phase fluids from water.

To provide a simple, low cost separator for multi-phase oil-water combinations, which may be installed on shipboard.

Other objects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT OF THE INVENTION

Figure 1:
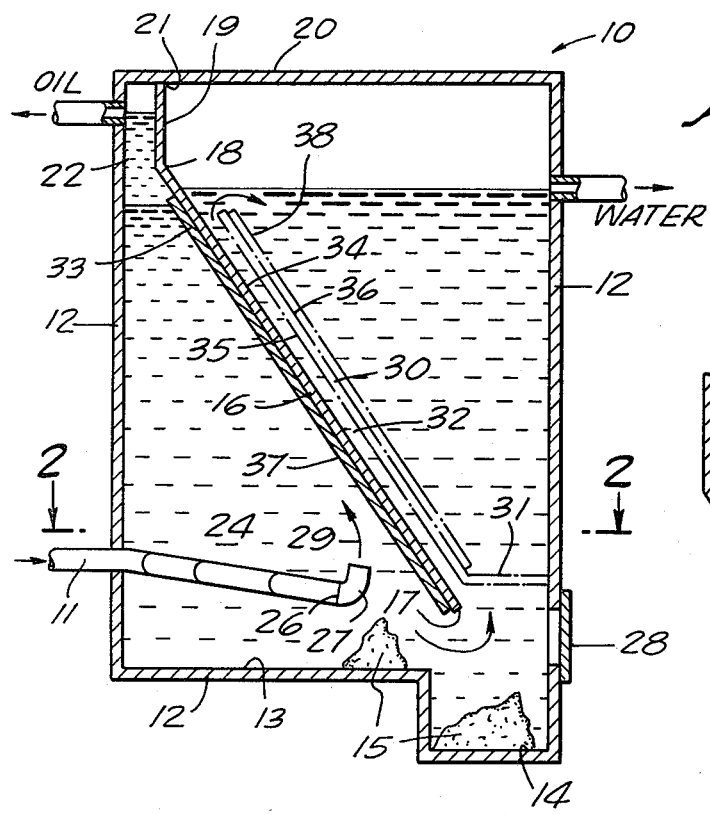
FIG. 1 is an elevational partial sectional view of the separator of this invention.
Figure 2:
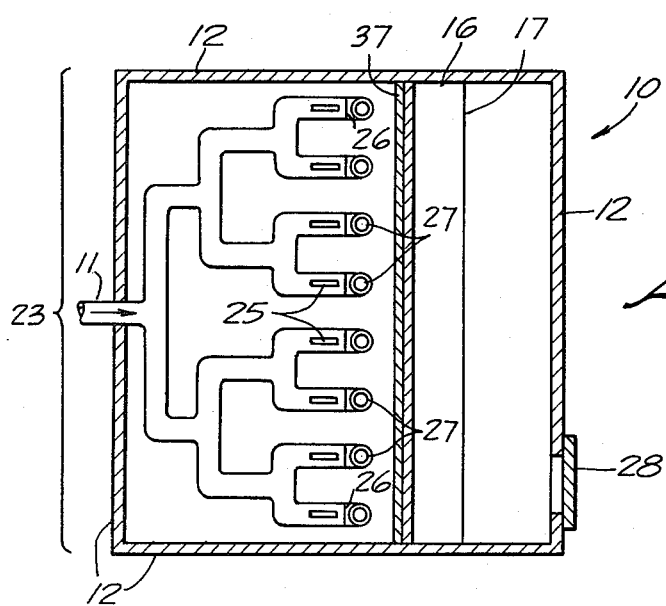
FIG. 2 is partial sectional view of the separator for multi-phase liquids through 2—2 of FIG. 1.

Referring to FIG. 1 in detail, the separator 10 has means for introducing a multi-phase fluid combination of an oil (low density) liquid phase, water phase and solid sludge (high density) at the inlet low velocity liquid spreader 11 of the closed separator tank 12. The base 13 of separator 10 can have a sump 14 which is useful for collecting high density sludge 15. A primary baffle is shown disposed in closed tank 12, the baffle 16 being secured to tank 12 walls across the tank 12 width as illustrated further in FIG. 2, at an approximately 45° angle. The primary baffle 16 has a base terminus 17 and a top baffle terminus 18. A vertical oil volume partition 19 is continuously secured at top baffle terminus 18 continuing vertically upward to tank 12 top 20, and joined leakproof at 21 to top 20. The narrow oil vertical volume phase collector 22 extends across the width 23 of tank cross section FIG. 2, and also extends downward to the top baffle terminus 18 and the like, as the less dense oil phase rises droplet-wise through the water phase 24 and collects at collector 22.

Figure 3:
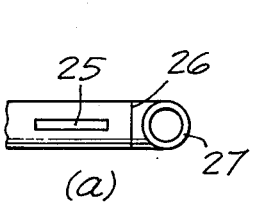
FIG. 3 is a plan view through 3—3 of FIG. 2, illustrating a terminal inlet pipe having a slot therein.
Figure 3:
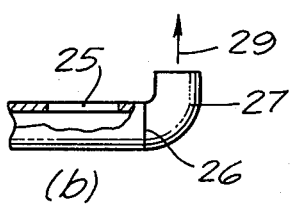

Referring again to FIGS. 1, 2 and 3, the inlet low velocity liquid spreader 11, is shown to be a single inlet pipe of the required volume and diameter which branches into multiple inlet pipe streams of eight, and sixteen volumes, or more. The successive division of the multi-phase inlet fluid streams, of equivalent inlet pipe diameters, decreases the inlet turbulent fluid flow to essentially laminar velocity fluid flow, and allows the separation of the oil phase to occur. The oil droplets separate out and begin to rise as a water immiscible phase through the water 24 to the oil volume 22.

FIGS. 3(a) and (b) illustrates slots 25 provided at the multiple pipe termini 26, slots 25 allow the separating oil droplets to rise in the water phase 24 as the droplets escape from the termini 26. Pipe elbows 27 can be secured to termini 26, and angularly disposed to provide upward direction of multi-phase fluid flow toward tank top 20. The sludge 15, denser than water, will fall and deposit on the inside base 13 of tank 12 and in sump base 14. The sludge 15 can be removed from tank 12 through hand-hole 28. The arrow 29 indicates the general direction of flow of inlet fluid from spreader 11.

Figure 4:
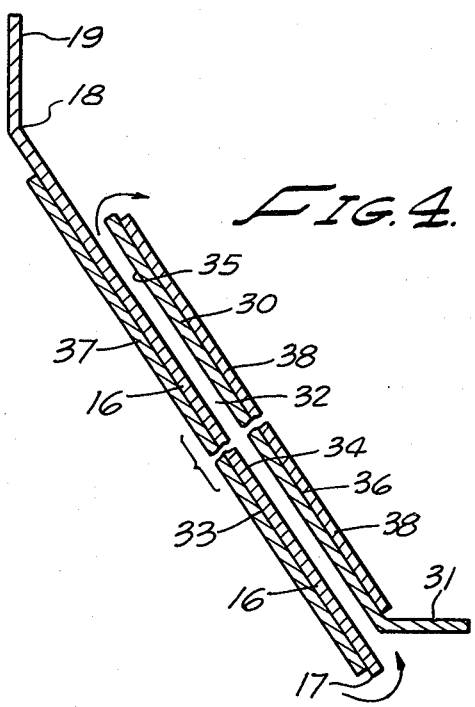
FIG. 4 is a sectional elevational view of another baffle modification of the separator of this invention.

A further modification of the primary baffle 16 is illustrated by the dashed lines 30 of FIG. 1, disposing a secondary baffle 30 closely spaced adjacent and parallel to primary baffle 16, baffle 30 disposed completely across the width 23 of tank 12. The secondary baffle 30 has a floor extension 31, as also illustrated in FIGS. 1 and 4, which is continuously secured across the tank width 23. The primary baffle 16 and secondary baffle 30 are spaced parallel and can range typically ¼ to 1 inch apart. The water channel 32 provides a water circulation path for water phase separating from the oil-water-sludge inlet fluid input, as from an oil well. The oil well fluid input is typically warm to hot in temperature (up to 100° C.). Allowing the separated water phase to channel up through channel 32, provides heat transfer from hot water to the primary baffle 16 on both the oil face 33 and the water face 34 of baffle 16. The oil face 33 provides a collecting area and volume for the separating oil droplets. The primary baffle 16 can have heating steam coils or a flat bed electrical heater pad 37 secured to the oil face 33, providing heat energy for the oil droplets collecting on oil face 33, and thus lowering the viscosity of the oil and allowing the oil droplets greater mobility. Also, the secondary baffle 30 can have a heat insulation layer 38 secured on the second face 36, decreasing heat transfer through the first face 35 of baffle 30.

The secondary baffle 30 is particularly useful when the separator 10 is processing hot oil-water-sludge phases from an oil well. When the separator 10 is processing oil-water phases, as from a modern outdoor oil spill in the ocean, beach, or the like, it can be more useful to have only a primary baffle 16, and a heating steam coils or electrical pad 37 secured on face 33, thus warming the fluid phase and accelerating the separation of oil and water droplets.

The separator 10 can be permanently mounted at an oil well site and equipped with a baffle modification as required by the oil-water-sludge input. The separator 10 can also be mounted on shipboard for cleaning up ocean oil spills. In either type of mounting, no great accuracy is required in leveling the tank structure 12, as the function of separator 10 is not a function of fluid levels.

The separator 10 can separate immiscible liquid phases as water and hydrocarbons, or water and other less dense fluid.

Many modifications in the separator for multi-phase liquids can be made in the light of my teachings. It is understood that within the scope of the claims, the invention can be practiced otherwise than as described.

I claim:

1. The separator combination for multi-phase liquids, comprising:

a closed separator tank having a regular cross section and a tank top, wall height, and base, an inlet low velocity liquid spreader disposed and secured in and through said closed tank adjacent to said closed tank base, said inlet spreader having extending multiple pipe branches of equivalent pipe diameters with pipe branch liquid outlets disposed in a single horizontal plane, said inlet spreader providing the decrease in the stream velocity of said multi-phase liquid from the initial inlet turbulent fluid flow to the exit laminar velocity fluid flow from the terminal pipe branch liquid outlets, a primary baffle disposed and secured in and fully across the tank interior width, said primary baffle inclined angularly in said tank from a baffle base terminus disposed adjacent said tank base and also covertly adjacent said terminal pipe branches of said inlet liquid spreader, said primary baffle angularly extending upward in said closed tank above said inlet liquid spreader, terminating at a top primary baffle terminus adjacent said tank top, a vertical oil volume partition extending vertically from and across said top primary baffle terminus upward to the interior of said tank top, providing a narrow oil vertical volume phase collector disposed above the oil phase-water phase separator volume, an oil phase outlet pipe disposed on and secured through said tank wall, providing an oil outlet communicating with said oil volume collector, said oil outlet pipe disposed and elevated above said primary baffle top terminus, a water phase outlet pipe disposed on and secured through said tank wall, providing a water outlet communicating with the separated water phase volume, said water phase outlet pipe elevated just above said primary baffle top terminus, and, a solid sludge phase outlet aperture disposed on and secured through said tank wall adjacent said tank base, providing means for sludge phase withdrawal from said tank as required.

2. In the separator combination set forth in claim 1, the further modification wherein, the primary baffle has heating means secured on and disposed contiguously across said primary baffle, on the primary baffle face adjacent said inlet low velocity spreader.

3. In the separator combination set forth in claim 1, the further modification wherein said terminal pipe branches of said inlet low velocity liquid spreader have linear slots disposed in said pipe branch liquid outlets.

4. In the separator combination set forth in claim 2, the further modification wherein, the primary baffle has a heat insulating pad means secured on and disposed contiguously across said primary baffle face opposed to said inlet low velocity spreader.

5. The separator combination for multi-phase liquids comprising:

a closed separator tank having a regular cross section and a tank top, wall height, and base, an inlet low velocity liquid spreader disposed and secured in and through said closed tank adjacent to said closed tank base, said inlet spreader having multiple pipe branches of equivalent pipe diameters with pipe branch liquid outlets disposed in a single horizontal plane, said inlet spreader providing the decrease in the stream velocity of said multi-phase liquid from the initial inlet turbulent fluid flow to the exit laminar velocity fluid flow from the terminal pipe branch liquid outlets, a primary baffle disposed and secured in and fully across the tank interior width, said primary baffle inclined angularly in said tank from a baffle base terminus disposed adjacent said tank base and also covertly adjacent said terminal pipe branches of said inlet liquid spreader, said primary baffle angularly extending upward in said closed tank above said inlet liquid spreader, terminating at a top baffle terminus adjacent said tank top, a vertical oil volume partition extending vertically from and across said top primary baffle terminus upward to the interior of said tank top, providing a narrow oil vertical volume phase collector disposed above the oil phase-water phase separator volume, a secondary baffle disposed and secured in and fully across the tank interior width parallel to and ranging ¼ to 1 inch above said primary baffle at the same angular inclination, said secondary baffle secured to the tank wall and having a baffle floor extension secured from the secondary baffle base terminus elevated above the tank base just above said primary baffle base terminus and extending to and joined to said tank wall, and angularly rising to a secondary baffle top terminus, terminating just below said primary top baffle terminus, an oil phase outlet pipe disposed on and secured through said tank wall, providing an oil outlet communicating with said oil volume collector, said oil outlet pipe disposed and elevated above said primary baffle top terminus, a water phase outlet pipe disposed and secured through said tank wall, providing a water outlet communicating with the separated water phase volume, said water phase outlet pipe elevated just above said primary baffle top terminus, and, a solid sludge phase outlet aperture disposed on and secured through said tank wall adjacent said tank base, providing means for sludge phase withdrawal from said tank as required.

6. In the separator combination set forth in claim 5, the further modification wherein, the primary baffle has heating means secured on and disposed contiguously across said primary baffle, on the primary baffle face adjacent said inlet low velocity spreader.

7. In the separator combination set forth in claim 5, the further modification wherein said terminal pipe branches of said inlet low velocity liquid spreader have linear slots disposed in said pipe branch liquid outlets.

8. In the separator combination set forth in claim 6, the further modification wherein said terminal pipe branches of said inlet low velocity liquid spreader have linear slots disposed in said pipe branches.

* * * * *